United States Patent
Tarolli et al.

(10) Patent No.: US 11,055,097 B2
(45) Date of Patent: Jul. 6, 2021

(54) DYNAMICALLY DETECTING UNIFORMITY AND ELIMINATING REDUNDANT COMPUTATIONS TO REDUCE POWER CONSUMPTION

(71) Applicant: NVIDIA CORPORATION, Santa Clara, CA (US)

(72) Inventors: Gary M. Tarolli, Concord, MA (US); John H. Edmondson, Arlington, MA (US); John Matthew Burgess, Austin, TX (US); Robert Ohannessian, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 802 days.

(21) Appl. No.: 14/048,647

(22) Filed: Oct. 8, 2013

(65) Prior Publication Data
US 2015/0100764 A1  Apr. 9, 2015

(51) Int. Cl.
*G06F 9/30* (2018.01)
*G06F 9/38* (2018.01)

(52) U.S. Cl.
CPC ...... *G06F 9/30181* (2013.01); *G06F 9/30072* (2013.01); *G06F 9/3836* (2013.01); *G06F 9/3851* (2013.01); *G06F 9/3887* (2013.01)

(58) Field of Classification Search
CPC ...... G06F 9/30; G06F 9/30145; G06F 1/3237; G06F 9/30181; G06F 9/3887
See application file for complete search history.

(56) References Cited

U.S. PATENT DOCUMENTS

| | | | | |
|---|---|---|---|---|
| 8,429,380 | B2* | 4/2013 | Hayashi | G06F 1/3203 712/22 |
| 2007/0277177 | A1* | 11/2007 | Kawamoto | G06F 9/3851 718/103 |
| 2010/0164949 | A1* | 7/2010 | Min | G06T 15/005 345/419 |
| 2011/0047349 | A1* | 2/2011 | Hayashi | G06F 1/3203 712/22 |

OTHER PUBLICATIONS

Guoping Long, et. al., Minimal Multi-Threading: Finding and Removing Redundant Instructions in Multi-Threaded Processors, 2010, 2010 43rd Annual IEEE/ACM International Symposium on Microarchitecture (MICRO), pp. 337-348.*

* cited by examiner

*Primary Examiner* — Keith E Vicary
(74) *Attorney, Agent, or Firm* — Artegis Law Group, LLP

(57) ABSTRACT

One embodiment of the present invention includes techniques to decrease power consumption by reducing the number of redundant operations performed. In operation, a streamlining multiprocessor (SM) identifies uniform groups of threads that, when executed, apply the same deterministic operation to uniform sets of input operands. Within each uniform group of threads, the SM designates one thread as the anchor thread. The SM disables execution units assigned to all of the threads except the anchor thread. The anchor execution unit, assigned to the anchor thread, executes the operation on the uniform set of input operands. Subsequently, the SM sets the outputs of the non-anchor threads included in the uniform group of threads to equal the value of the anchor execution unit output.

23 Claims, 6 Drawing Sheets

DYNAMICALLY DETECTING UNIFORMITY AND ELIMINATING REDUNDANT COMPUTATIONS TO REDUCE POWER CONSUMPTION

BACKGROUND OF THE INVENTION

Field of the Invention

Embodiments of the present invention relate generally to computer processing and, more specifically, to dynamically detecting uniformity and eliminating redundant computations to reduce power consumption.

Description of the Related Art

A typical computer system includes a central processing unit (CPU) and a parallel processing unit (PPU). Some PPUs are capable of very high performance using a relatively large number of small, parallel execution threads on dedicated programmable hardware processing units. The specialized design of such PPUs usually allows these PPUs to perform certain tasks, such as rendering 3-D scenes, much faster than a CPU. However, the specialized design of these PPUs also limits the types of tasks that the PPU can perform. By contrast, the CPU is typically a more general-purpose processing unit and therefore can perform most tasks. Consequently, the CPU usually executes the overall structure of a software application and configures the PPU to implement portions of the software application that are amenable to concurrent execution.

In many PPUs, same instruction techniques are used to efficiently support parallel execution of a large number of generally synchronized threads to perform identical processing and/or compute operations. The set of processing units may concurrently perform a variety of different operations including integer and floating point arithmetic (e.g., addition and multiplication), comparison operations, Boolean operations (AND, OR, XOR), bit-shifting, computation of various algebraic functions (e.g., planar interpolation and trigonometric, exponential, and logarithmic functions, etc.), and random number generation. Notably, many of these operations, such as arithmetic and comparison operations, are deterministic—performing the operation on a particular set of values for the input operands always produces the same output data. Further, in operation, the values across sets of input operands for many algorithms, such as graphics processing or finite element analysis, exhibits spatial uniformity within relatively small areas (e.g. 4 pixels, 32 pixels, etc.). As persons skilled in the art will recognize, spatial uniformity for an input operand occurs when values across different locations in an image are equal at a given point in time. By contrast, temporal uniformity for an input operand occurs when the values at a particular location are equal across multiple points in time. Notably, within such "uniform sets of input operands," although the value of any particular input operand across the sets is uniform, the values of the different input operands may vary. For instance, thirty-two threads may execute a comparison operation between two operands A='red' and B='blue.'

Consequently, multiple threads often concurrently execute the same deterministic operation on uniform sets of input operands and generate the same output data. In general, redundantly performing computations associated with uniform sets of input operands unnecessarily increases power consumption. For instance, suppose that four threads were to execute an addition operation on the operands '1' and '2.' In such a scenario, each of four execution units would consume P power to generate the output data '3.' Thus, three of the four execution units would redundantly generate the output data '3,' and the PPU would expend four times more power than required to generate the output data. As is well known, any unnecessary power consumption is generally undesirable, particularly for portable handheld devices where the acceptable power consumption may be very limited.

Accordingly, what is needed in the art is a more effective approach to processing uniform operations on uniform sets of data in parallel architectures.

SUMMARY OF THE INVENTION

One embodiment of the present invention includes a system configured to eliminate redundant computations. The system includes a memory that includes a first set of operands associated with a first thread and a second set of operands associated with a second thread; and a streaming multiprocessor coupled to the memory and configured to determine that both the first thread and the second thread are configured to execute a first deterministic operator; determine that a value of each operand included in the first set of operands equals a value of a corresponding operand included in the second set of operands; in response, activate a first uniformity signal; cause the first thread to execute the first deterministic operator on the first set of operands to generate a first output; and cause the second thread to set a second output equal to the first output without executing the first deterministic operator on the second set of operands.

One advantage of the disclosed techniques is that the streaming multiprocessor leverages data uniformity to reduce the number of redundant operations. In particular, because the streaming multiprocessor recognizes uniform sets of operands, the streaming multiprocessor dynamically identifies opportunities to eliminate deterministic operations. Since the streaming multiprocessor exploits these opportunities, the power required to perform operations on uniform sets of data is reduced compared to conventional streaming multiprocessors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
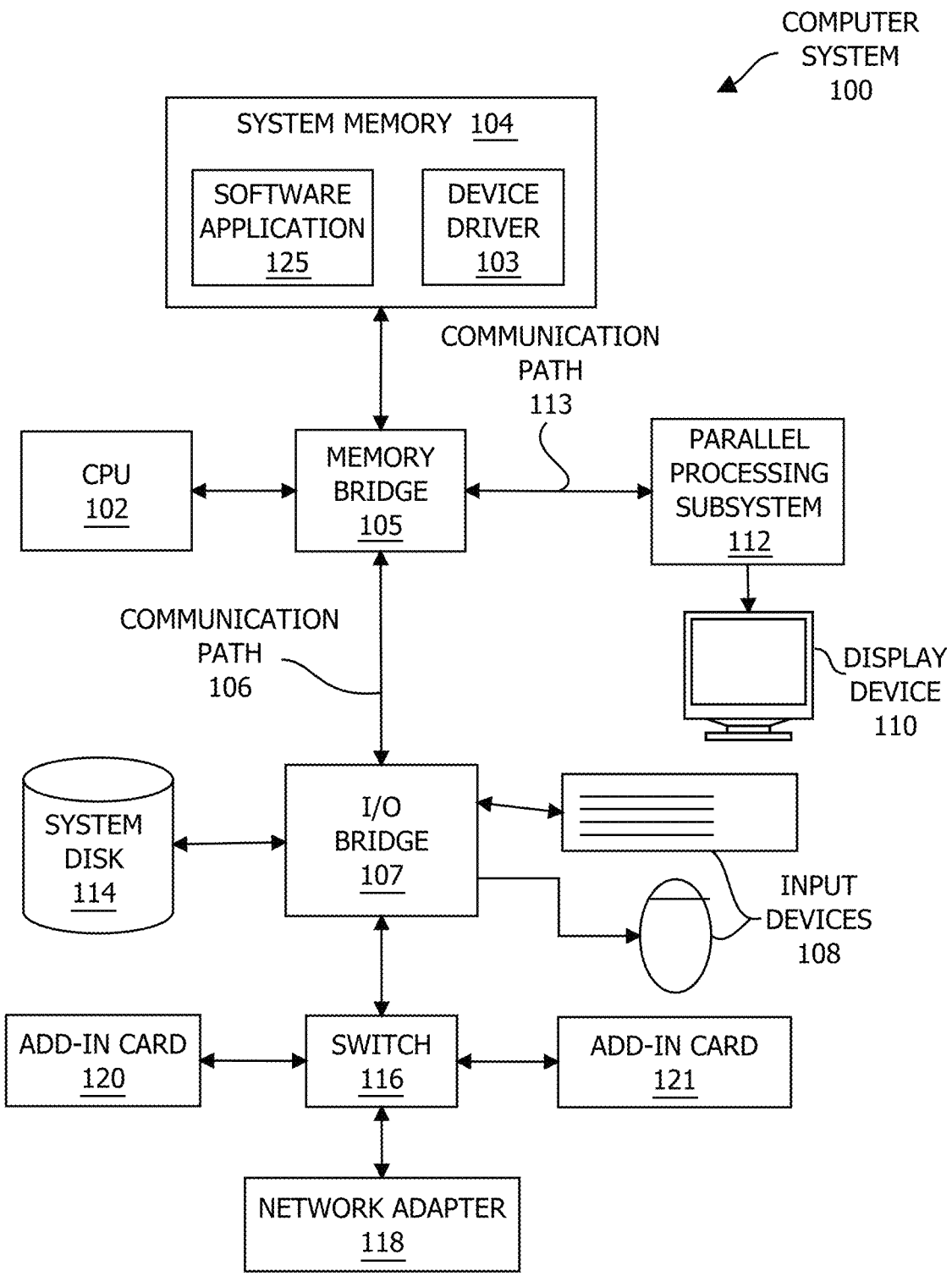
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
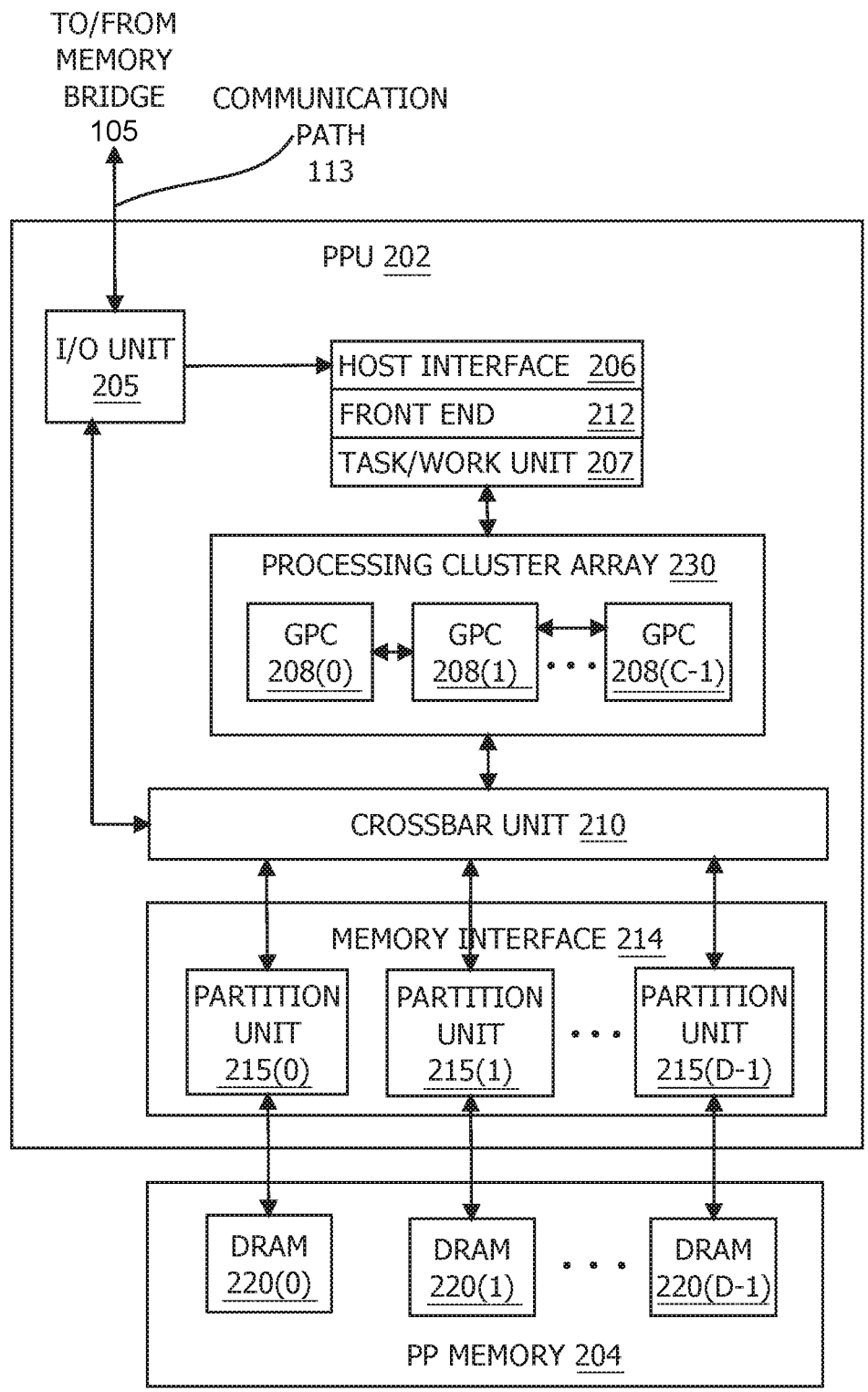
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
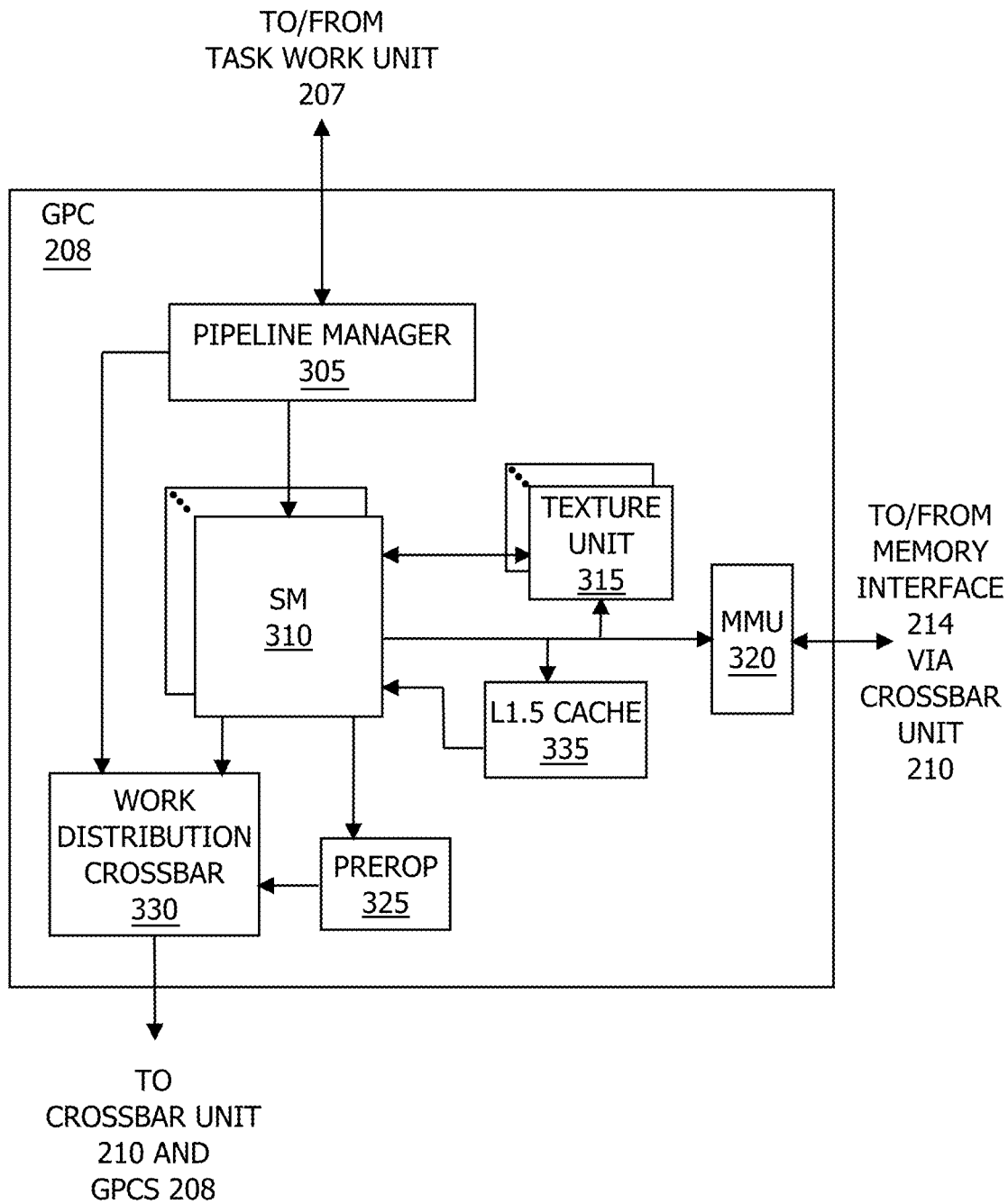
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M SMs 310, where M≥1. Also, each SM 310 includes a set of functional execution units (not shown in FIG. 3), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group," "quad," or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Eliminating Redundant Operations

Again, the software application 125 configures the PPU 202 to execute a large number of threads in parallel to perform graphics, general processing and/or compute operations. As part of performing these operations, the PPU 202 often configures one or more SMs 310 to perform a deterministic operation across a thread group (e.g., SIMD techniques). Notably, the input data associated with the thread group is often closely correlated within relatively small areas, such as a square viewport that includes 16 pixels. For instance, such a viewport may represent the background of a graphics image (each pixel exhibiting the same visual properties) and the operation may be a comparison between the pixel color and "black."

The SM 310 is configured to identify thread groups (e.g., quads of four threads or warps of thirty-two threads) which, when executed, apply the same deterministic operation across parallel sets of input operands, some of which may be uniform. More specifically, the value of a particular input operand associated with the deterministic operation is the same for each set of input operands. However, the values of different operands within a single set of input operands may vary. Because the operation is deterministic and the sets of input operands are uniform, applying the operation to each set of input operands results in the same output value. Advantageously, the SM 310 is configured to exploit the guaranteed uniformity of output values to reduce the power consumption associated with executing the group of threads.

As persons skilled in the art will recognize, some operations may depend on implicit operands. For instance, some operations move a thread id to a register, where the thread id is not an explicit input operand. Consequently, applying such an operation on sets of uniform operands may result in different output values. As used herein, the output values of "deterministic operations" do not depend on implicit operands. In alternate embodiments, "deterministic operations" may depend on implicit operations. In such embodiments, the SM 310 may evaluate the existence of implicit operands as part of determining whether output values are guaranteed to be uniform in any technically feasible fashion.

In one embodiment, the SM 310 identifies an anchor thread and a corresponding anchor execution unit. The SM 310 determines whether the set of input operands associated with the anchor thread is uniform with respect to each set of input operands associated with the other threads included in the thread group. If the SM 310 determines that the thread group is uniform both with respect to the operation and across the sets of input operands, then the SM 310 disables the execution units associated with the non-anchor threads included in the thread group. For instance, suppose that each thread included in a quad of threads were configured to execute an addition operation between the input operands '1' and '2.' In such a scenario, the SM 310 would disable three of the four addition units associated with the quad of threads.

The SM 310 configures the anchor execution unit to perform the operation on the uniform set of input data, thereby generating the output associated with the anchor thread. Further, the SM 310 sets the value of the outputs associated with the non-anchor threads to the value of the output of the anchor execution unit. In this fashion, the SM 310 ensures that each thread included in the thread group generates the correct output. Notably, only a single execution unit included in the SM 310 performs the operation the remaining execution units are idle and, thereby, the SM 310 dramatically reduces the power consumption associated with executing the thread group. By contrast, in conventional SMs, all of the execution units associated with the thread group would redundantly perform the operation, unnecessarily consuming power.

As persons skilled in the art will understand, embodiments of the invention include any processing unit (e.g. PPU 202, GPC 208, etc.) that detects uniform sets of input operands and reduces associated redundant operations in any technically feasible fashion. In some embodiments, the SM 310 may identify any two threads that are uniform, disable the execution unit associated with one of the threads, and set the output of both threads to the output of the enabled execution unit. In alternate embodiments, the processing unit may detect uniform sets input data in a hierarchical fashion. For instance, the processing unit may first determine uniformity across an anchor quad and, subsequently, determine uniformity across eight quads included in a warp with respect to the anchor quad. In such a scenario, if the processing unit determines that the warp is uniform, then the processing unit disables thirty-one of the thirty-two execution units assigned to the warp.

Figure 4:
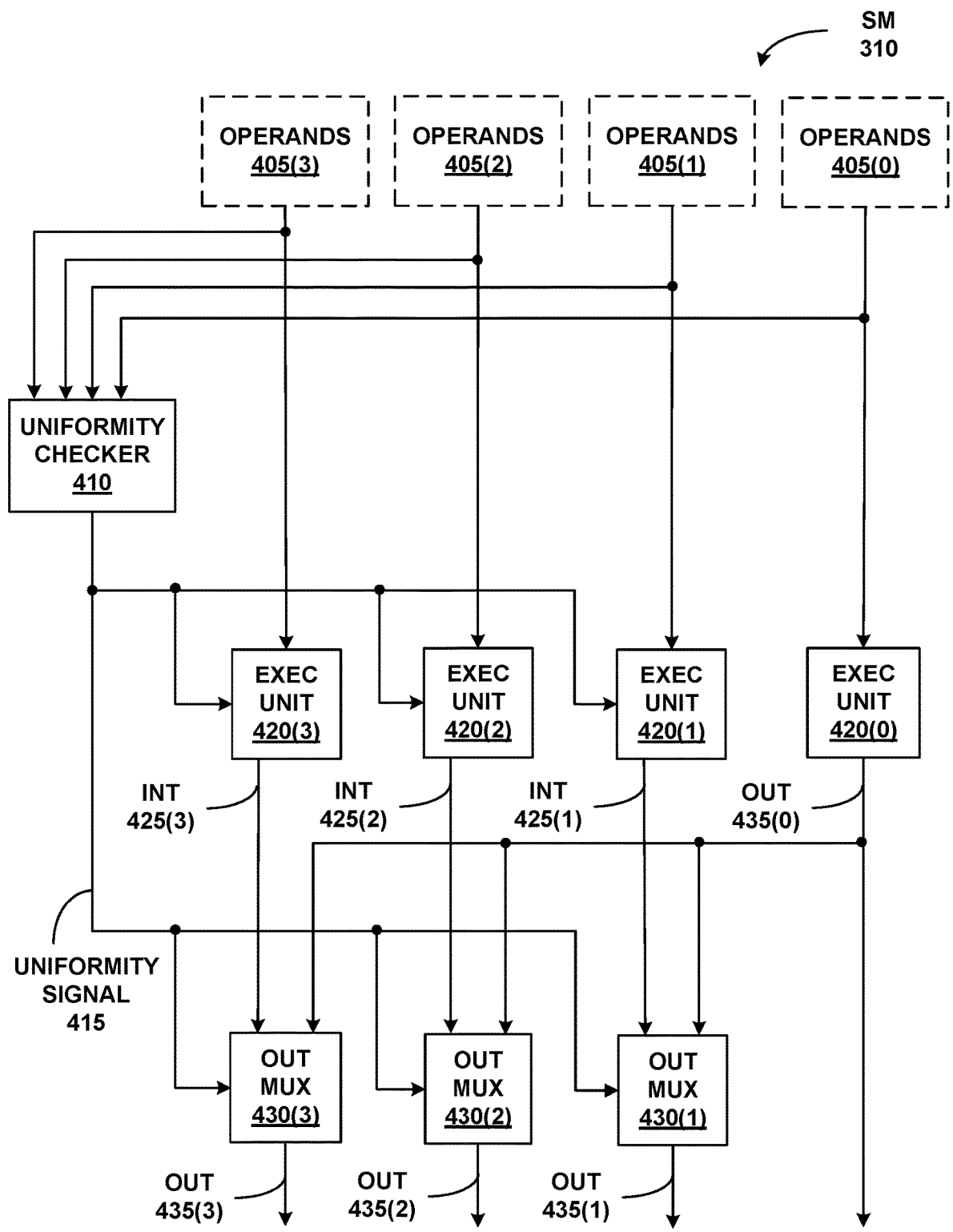
FIG. 4 is a conceptual diagram illustrating how the streaming multiprocessor of FIG. 3 can be configured to eliminate redundant operations across a uniform quad, according to one embodiment of the present invention.

FIG. 4 is a conceptual diagram illustrating how the streaming multiprocessor (SM) 310 of FIG. 3 can be configured to eliminate redundant operations across a uniform quad, according to one embodiment of the present invention. The SM 310 is configured to process a quad of threads included in a thread group, where each thread is associated with an operator (not shown), a set of input operands (operands) 405, an execution unit (exec unit) 420, and an output (out) 435. In alternate embodiments, the SM 310 may be configured to process any number of threads and include any number of execution units 420.

The SM 310 also includes, without limitation, a uniformity checker 410 and three output multiplexers (out muxes) 430. In alternate embodiments, the SM 310 may include any number and combination of uniformity checkers 410 and output muxes 430. For instance, in some embodiments, the uniformity checker 410 may be divided into four quad-level uniformity checkers and a warp-level uniformity checker. Further, the number of execution units 420 may or may not equal the number of output muxes 430.

The uniformity checker 410 is configured to process the sets of input operands 405 and generate a uniformity signal 415. In general, the uniformity checker 410 sets the uniformity signal 415 to a 'true' value (Boolean '1') when causing each of the threads to execute the assigned operator on the assigned set of input operands 405 would result in the same value for each of the outputs 435. In particular, the uniformity checker 410 compares the four sets of input operands 405(0), 405(1), 405(2), and 405(3) to determine the uniformity across the sets of input operands 405. Notably, the uniformity checker 410 may determine that the sets of input operands 405 are uniform irrespective of whether the values of the operands included in each set of input operands 405 differ. For instance, if each set of input operands 405 includes an A input operand and a B input operand, then the sets of input operands 405 may be uniform regardless of whether the value of the A input operand and the B input operand differ.

The uniformity checker 410 may be implemented in any technically feasible fashion. In one implementation, the uniformity checker 410 includes three comparators that compare the set of input operands 405(0) assigned to an "anchor" thread to each of the other sets of input operands 405. The SM 310 may determine the anchor thread in any fashion that is consistent with the architecture of the SM 310. For instance, the SM 310 may associate the thread identified by the lowest thread ID with the anchor execution unit 420(0). In operation, the first comparator compares the set of input operands 405(1) to the anchor set of input operands 405(0). The second comparator compares the set of input operands 405(2) to the anchor set of input operands 405(0). And the third comparator compares the set of input operands 405(3) to the anchor set of input operands 405(0).

Subsequently, the uniformity checker 410 performs a logical AND operation between the outputs of each of the comparators and a bit that indicates whether the operation is a deterministic operation. If any of the comparators indicate that the corresponding pair of input operands 405 do not match or the operation is not a deterministic operation, then the uniformity checker 410 sets the uniformity signal 415 to a value of 'false' (i.e., Boolean '0'). By contrast, if all of the comparators indicate that the corresponding pair of input operands 405 match and the operation is a deterministic operation, then the uniformity checker 410 sets the uniformity signal 415 to a value of 'true.' In alternate embodiments, the SM 310 may implement logic that determines uniformity across the sets of input operands 405 in any technically feasible fashion. Again, in some embodiments, the SM 310 may be configured to determine the uniformity signal 415 in a hierarchical manner—across the threads within a quad and, subsequently, across the quads within a warp. In such embodiments, the implementation of the uniformity checker 410 and the routing of the uniformity signal 415 will differ accordingly.

As shown, for each of the non-anchor threads, the value of the uniformity signal 415 impacts the operation of the assigned execution unit 420 and the associated output mux 430. More specifically, the uniformity signal 415 controls whether the execution units 420(1) through 420(3) are enabled. In addition, the uniformity signal 415 causes the output muxes 430 to select between the output of the corresponding execution unit 420 and the output of the anchor execution unit 420(0). By contrast, for the anchor thread, the value of the uniformity signal 415 does not impact the operation of the anchor execution unit 420(0), and there is no output mux corresponding to the anchor execution unit 420(0). Irrespective of the value of the uniformity signal 415, the anchor thread executes the operation on the set of input operands 405(0) via the anchor execution unit 420(0), generating the output 435(0).

If the value of uniformity signal 415 is 'false,' then the non-anchor threads execute the operation on the assigned sets of input operands 405(1) through 405(3) via the execution units 420(1) through 420(3), generating the intermediates (int) 425(1) through 425(3). Subsequently, the uniformity signal 415 causes the output mux 430 associated with each non-anchor thread to select the corresponding intermediate 425 as the output 435 associated with the thread.

Advantageously, if the value of the uniformity signal 415 is 'true,' then the SM 310 leverages the uniformity across the quad to reduce redundant operations. In operation, the 'true' uniformity signal 415 disables the execution units 420(1) through 420(3). In addition, the 'true' uniformity signal 415 causes the output muxes 430 to select the output of the anchor execution unit 420(0) as the outputs 435(1) through 435(3) associated with the non-anchor threads. By contrast, conventional processing units would execute the operation on the assigned sets of operands 405(1) through 405(3) via three execution units 420, redundantly computing the outputs 435(1) through 435(3). Notably, the SM 310 generates the correct outputs 435 for the thread group while performing fewer operations and, therefore, consuming less power than conventional processing units. The SM 310 may disable the execution units 420(1) through 420(3) in any technically feasible fashion. In one embodiment, the SM 310 clock-gates the execution units 420(1) through 420(3)—overriding existing clock-gating circuitry with the uniformity signal 415. In alternate embodiments, the SM 310 disables the execution units 420(1) through 420(3) using power-gating. In some alternate embodiments, other strategies that are appropriate for the technology (such as a non-CMOS technology) may be employed to disable the execution units.

In alternate embodiments, the SM 310 may be configured to compare the values of the outputs 435, store the result of such comparisons as uniformity tags, and implement the uniformity checker 410 based on the uniformity tags. In one embodiment, the SM 310 includes three comparators, each of which generates a different uniformity tag. The first comparator compares the value of the output 435(1) to the value of the anchor output 435(0). The second comparator compares value of the output 435(2) to the value of the anchor output 435(0). And the third comparator compares the value of the output 435(3) to the value of the anchor output 435(0). For subsequent operations that include the outputs 435 in the set of input operands 405, the uniformity checker 410 uses the uniformity tags to determine the uniformity signal 415.

In yet other alternate embodiments, the uniformity checker 410 may be configured to detect uniformity at any granularity. For instance, in some embodiments, the uniformity checker 410 is configured to detect uniformity on a per-warp basis. In other embodiments, the uniformity checker 410 is configured to detect uniformity on a per-thread basis. In such an embodiment, the uniformity checker 410 may generate three unique uniformity signals—one for each of the non-anchor threads included in a quad. Further, each of the uniformity signals may disable a different execution unit and control a different output mux. In such a scenario, if only one of the sets of input operands associated with the non-anchor threads matches the set of input operands associated with the anchor thread, then only one quarter of the execution units will be disabled.

The architecture of the SM 310 may be altered to support any uniformity detection scheme—using any number and combination of comparators, muxes, clock-gating circuitry, or other elements Notably, the amount of logic used to implement the uniformity detection is typically considerably less than the logic used to implement the execution unit. In some alternate embodiments, the uniformity detection scheme may include implicit operands. In some such embodiments, the uniformity checker may perform a logic AND operation between bits that indicate uniformity across the sets of input operands, a bit that indicates whether the operation is deterministic, and a bit that indicates whether the operation depends on implicit operands.

Figure 5:
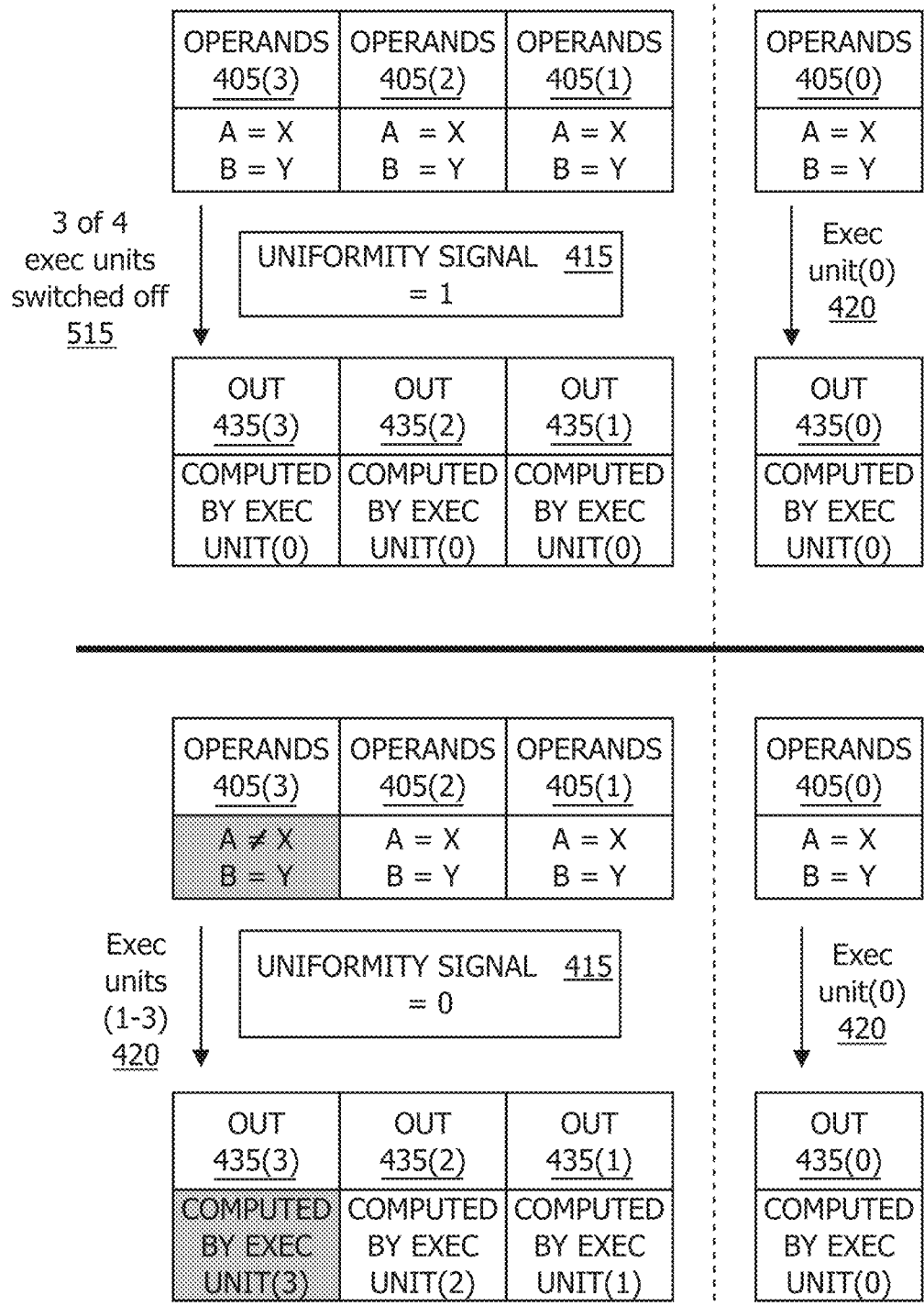
FIG. 5 is a conceptual diagram illustrating the sets of input operands, uniformity signals, and outputs of FIG. 4, according to one embodiment of the present invention.

FIG. 5 is a conceptual diagram illustrating the sets of input operands 405, uniformity signals 415, and outputs 435 of FIG. 4, according to one embodiment of the present invention. As shown, FIG. 5 depicts two quads, one in which the sets of input operands 405 are uniform, and one in which the sets of input operands 405 are not uniform. For explanatory purposes, the SM 310 is configured to process both of the quads in parallel. Further, when executed, all of the threads included in the quads apply the same deterministic operation on the assigned set of input operands 405. As shown, the assigned set of input operands 405 includes two input operands: A and B.

The first quad is depicted above the dark horizontal line. For the anchor set of operands 405(0), the value of the A operand is X and the value of the B operand is Y. Similarly, for the second set of operands 405(1), the third set of operands 405(2), and the fourth set of operands 405(3), the value of the A operand is X and the value of the B operand is Y. Consequently, the uniformity checker 410 generates a value of Boolean '1' for the uniformity signal 415, and three of the four execution units 420 are switched off 515. In particular, the value of Boolean '1' for the uniformity signal 415 clock-gates the execution units 420(1) through 420(3), turning off the execution units 420(1) through 420(3) to eliminate redundant operands and, thereby, conserve power. The anchor execution unit 420(0) is not affected by the uniformity signal 415, and the anchor thread executes the operation on the anchor set of operands 405(0), generating the output 435(0). The output muxes 430(1) through 430(3) distribute the output 435(0) to each of the non-anchor threads included in the warp. In this fashion, each of the threads included in the warp is associated with the correct, identical, output 435.

The second quad is depicted below the dark horizontal line. For the anchor set of operands 405(0), the value of the A operand is X and the value of the B operand is Y. Similarly, for the second set of operands 405(1) and the third set of operands 405(2), the value of the A operand is X and the value of the B operand is Y. However, as shown, for the fourth set of operands 405(3) the value of the A operand is not X. Consequently, the results of applying the operator to the anchor set of operands 405(0) may be different than the result of applying the operator to the fourth set of operands 405(3). Correspondingly, the uniformity checker 410 generates a value of Boolean '0' for the uniformity signal 415, and each of the execution units 420(1) through 420(3) execute the operation on the respective set of operands 405(1) through 405(3). Again, the anchor execution unit 420(0) is unaffected by the uniformity signal 415, and the anchor thread executes the operation on the anchor set of operands 405(0), generating the output 435(0). The output muxes 430(1) through 430(3) route the outputs of the corresponding execution units 420(1) through 420(3) to the assigned non-anchor threads included in the warp. In this fashion, each of the threads included in the warp is associated with the correct—and potentially different—output 435.

Figure 6:
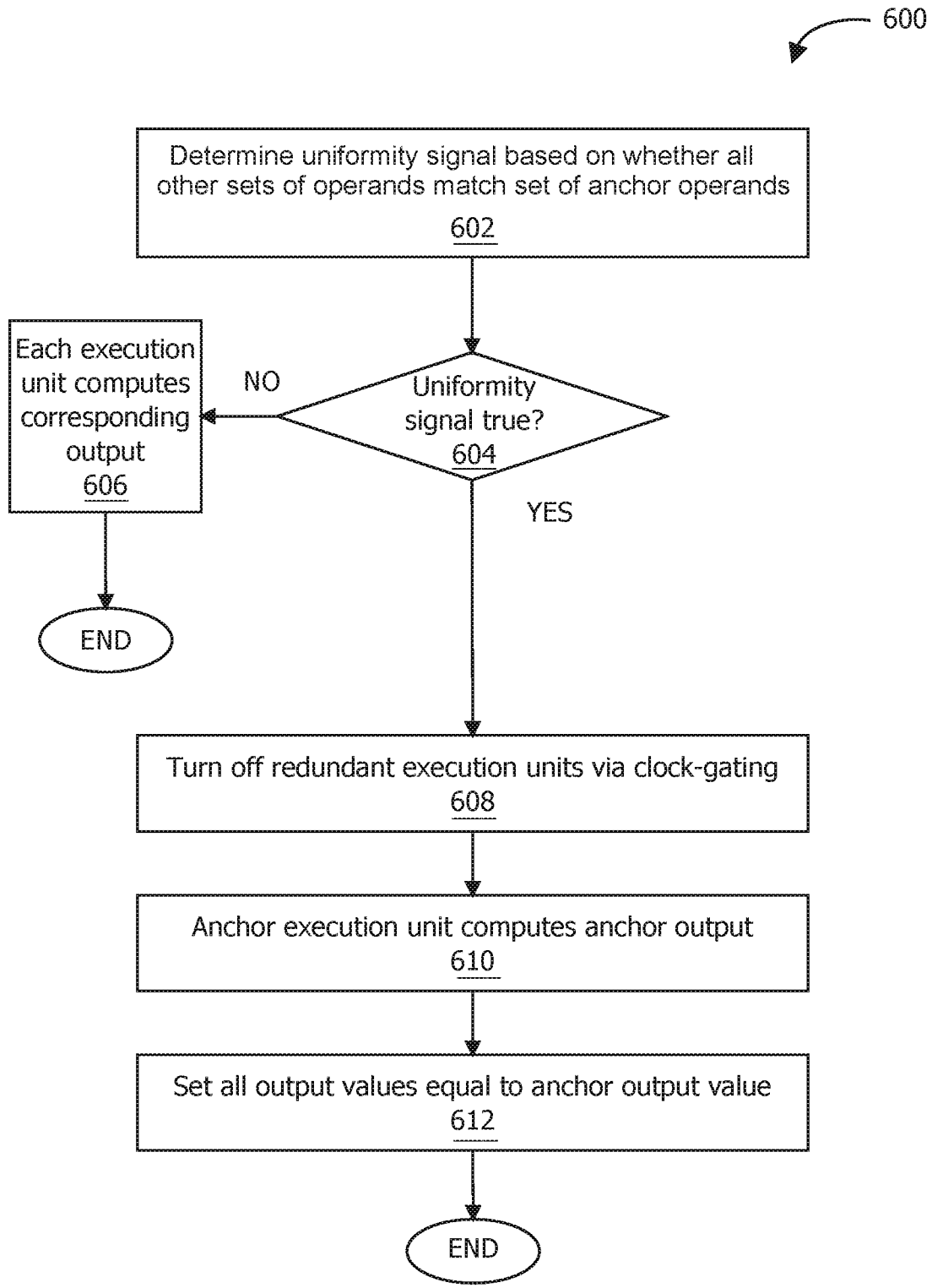
FIG. 6 is a flow diagram of method steps for detecting uniform operations across multiple threads and reducing redundancies, according to one embodiment of the present invention.

FIG. 6 is a flow diagram of method steps for detecting uniform operations across multiple threads and reducing redundancies, according to one embodiment of the present invention. Although the method steps are described with reference to the systems of FIGS. 1-5, persons skilled in the art will understand that any system configured to implement the method steps, in any order, falls within the scope of the present invention.

For explanatory purposes, the context of FIG. 6 is that the SM 310 is configured to process a particular thread group that includes N threads, where N≥1. When executed, each thread in the thread group applies the same deterministic operation to an associated set of input operands 405. The SM 310 may determine whether the operation is deterministic in any technically feasible fashion. For example, the SM 310 may be configured to determine that all operations are deterministic except for pre-specified operations, such as a random number operation. The operation may be associated with any number of input operands that are supported by the architecture of the SM 310. For instance, a 'not' operator may be associated with one operand, and an addition operation may be associated with two operands.

As shown, a method 600 begins at step 602, where the SM 310 generates the uniformity signal 415 based on whether the sets of input operands 405 are uniform. More specifically, the SM 310 determines whether the values of a set of input operands 405(0) associated with an anchor thread match the values of the sets of input operands 405(1) through 405(N-1) associated with the remaining threads included in the thread group. For instance, for an operation that is associated with two input operands, the SM 310 determines whether both the value of the first input operand is uniform across the sets of input operands 405 and the value of the second input operand is uniform across the sets of input operands 405.

If the SM 310 determines that the sets of input operands 405 differ across the thread group, then the SM 310 sets the value of the uniformity signal 415 to 'false.' If the SM 310 determines that the sets of input operands 405 are uniform across the thread group, then the SM 310 sets the value of the uniformity signal 415 to 'true.' The SM 310 may generate the uniformity signal in any technically feasible fashion. For instance, the SM 310 may implement a particular uniformity checker 410 with a set of (N-1) comparators. In alternate embodiments, the SM 310 may be configured to determine the uniformity signal 415 in a hierarchical manner—across the threads within a quad and, subsequently, across the quads within a warp.

At step 604, if the SM 310 determines that the uniformity signal 415 is "false," then the method 600 proceeds to step 606. At step 606, the SM 310 configures a set of N execution units 420 to execute the operation on the corresponding set of input operands 405. In operation, the N execution units 420 generate N outputs 435—one corresponding to each thread included in the thread group. The method 600 then terminates.

If, at step 604, the SM 310 determines that the uniformity signal 415 is "true," then the method 600 proceeds to step 608. At step 608, the SM 310 turns off (N-1) redundant execution units 420 via clock-gating. In particular, the SM 310 turns off the (N-1) execution units 420 that are assigned to the (N-1) non-anchor threads included in the thread group. The SM 310 may turn off the non-anchor execution units 420 in any technically feasible fashion. For instance, the SM 310 may override existing clock-gating circuitry with the uniformity signal 415. In alternate embodiments, such as a hierarchical implementation, the anchor execution unit 420 corresponding to a redundant thread group may also be turned off based on the uniformity signal 415. In such a scenario, the entire thread group is configured to output the same value as a different thread group.

At step 610, the anchor thread executes within the anchor execution unit 420(0)—performing the operation on the anchor set of input operands 405(0). At step 612, the SM 310 sets the value of the outputs of the non-anchor threads to the value of the output of the anchor execution unit 420(0), and the method 600 terminates. In this fashion, the SM 310 performs the operation only once and, subsequently, replicates the output 435(0) across the thread group. The SM 310 may set the value of the non-anchor threads in any technically feasible fashion. For instance, the SM 310 may assign an output mux 430 to each thread. The output mux 430 selects between the output of the execution unit 420 that is assigned to the thread and the anchor execution unit 420(0) based on the uniformity signal 415. For each non-anchor thread, if the uniformity signal 415 is "true," then the assigned output mux 430 selects the output 435(0) of the anchor execution unit 420(0) as the thread output. Advantageously, since the SM 310 turns off the redundant execution units 420, the SM 310 reduces the power consumption associated with performing the operation across the thread group by a ratio of approximately (N−1)/N compared to conventional SMs.

In sum, the disclosed techniques enable SMs to identify and exploit opportunities for power reduction based on data uniformity. In one instance, a uniformity checker implemented in the SM generates a per-quad uniformity signal based on whether each of the four threads included in the quad is associated with the same deterministic operation and the same input operand values. An anchor execution unit is assigned to one of the four threads—the anchor thread—and executes the operation on the associated set of input operands irrespective of the uniformity signal. Three other execution units and three output muxes are assigned to the remaining three threads. The uniformity signal is an input to each of these execution units and output muxes. If the uniformity signal is false, then each of the three execution units executes the operation on the associated set of input operands, and each of the three output muxes selects the output of the associated execution unit. By contrast, if the uniformity signal is true, then each of the associated execution units is clock-gated and, therefore, the associated execution unit does not execute the operation. Subsequently, each of the three output muxes selects the output of the anchor execution unit. In this fashion, the PPU reuses the output of the anchor execution unit instead of performing redundant operations across a set of execution units.

Advantageously, the disclosed techniques enable SMs to reduce power consumption attributable to redundantly performing the same operation across uniform sets of input operands. In one instance, the SM reduces the power consumption associated with four threads applying the same deterministic operation across four uniform sets of input operands by nearly 75% compared to conventional SMs. Consequently, the disclosed techniques reduce the likelihood of the PPU exceeding acceptable power consumption thresholds.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A system configured to eliminate redundant computations, the system comprising:
   a memory that includes a first set of operands associated with a first thread and a second set of operands associated with a second thread; and
   a streaming multiprocessor coupled to the memory and configured to:
      determine whether an operator corresponding to a given deterministic operation is assigned to both the first thread and the second thread;
      determine whether a value of each operand in the first set of operands equals a value of a corresponding operand in the second set of operands;
      in response to determining that the operator corresponding to the given deterministic operation is assigned to both the first thread and the second thread and that the value of each operand in the first set of operands equals the value of a corresponding operand in the second set of operands, determine that the first thread and the second thread are uniform;
      cause the first thread to execute, within a first execution unit, the operator on the first set of operands to generate a first output;
      in response to determining that the first thread and the second thread are uniform, activate a first uniformity signal; and
      in response to activating the first uniformity signal, cause the second thread to set a second output equal to the first output without executing the operator on the second set of operands.

2. The system of claim 1, wherein the first uniformity signal causes a second execution unit on which the second thread executes to be disabled.

3. The system of claim 2, wherein the first uniformity signal causes the second execution unit to be clock-gated.

4. The system of claim 2, wherein the second thread is associated with an output multiplexer that is configured to select between the first output and an output of the second execution unit.

5. The system of claim 2, wherein the first execution unit comprises an arithmetic logic unit.

6. The system of claim 1, wherein the streaming multiprocessor is further configured to set a first uniformity tag to indicate that the second output has been set equal to the first output.

7. The system of claim 6, wherein the streaming multiprocessor is further configured to perform write operations to store the first uniformity tag in the memory.

8. The system of claim 7, wherein determining that the value of each operand in the first set of operands equals the value of a corresponding operand in the second set of operands comprises determining that a first value of each uniformity tag associated with the second set of operands has been set.

9. The system of claim 1, wherein the memory further includes a third set of operands associated with the first thread and a fourth set of operands associated with the second thread, and the streaming multiprocessor is further configured to:
   determine that a second operator corresponding to a second deterministic operation is assigned to both the first thread and the second thread;
   determine that a value of an operand included in the third set of operands does not equal a value of a corresponding operand included in the fourth set of operands;

cause the first thread to execute the second operator on the third set of operands to generate a third output; and cause the second thread to execute the second operator on the fourth set of operands to generate a fourth output.

10. The system of claim 1, wherein the streaming multiprocessor includes the first execution unit and one or more other execution units, wherein the first execution unit is an anchor execution unit, and wherein the streaming multiprocessor is configured to assign the first thread to the anchor execution unit.

11. The system of claim 1, wherein the streaming multiprocessor is further configured to select the first thread as an anchor thread based on a thread identifier associated with the first thread.

12. The system of claim 1, wherein the streaming multiprocessor is further configured to:

determine that a third thread and a fourth thread are uniform based on a value of each operand included in a third set of operands equaling a value of a corresponding operand included in a fourth set of operands;

subsequent to determining that the first thread and the second thread are uniform and subsequent to determining that the third thread and the fourth thread are uniform, determine that the first thread, the second thread, the third thread, and the fourth thread are uniform, wherein the first uniformity signal is activated in response to determining that the first thread, the second thread, the third thread, and the fourth thread are uniform, and wherein, in response to the first uniformity signal being activated, the third thread sets a third output equal to the first output without executing the operator on the third set of operands and, in response to the first uniformity signal being activated, the fourth thread sets a fourth output equal to the first output without executing the operator on the fourth set of operands.

13. A computer-implemented method for eliminating redundant computations, the method comprising:

determining whether an operator corresponding to a given deterministic operation is assigned to both a first thread and a second thread;

determining whether a value of each operand in a first set of operands equals a value of a corresponding operand in a second set of operands;

in response to determining that the operator corresponding to the given deterministic operation is assigned to both the first thread and the second thread and that the value of each operand in the first set of operands equals the value of a corresponding operand in the second set of operands, determining that the first thread and the second thread are uniform;

causing the first thread to execute the operator corresponding to the given deterministic operation on the first set of operands to generate a first output;

in response to determining that the first thread and the second thread are uniform, activating a first uniformity signal; and in response to activating the first uniformity signal,
causing the second thread to set a second output equal to the first output without executing the operator corresponding to the given deterministic operation on the second set of operands.

14. The method of claim 13, wherein the first thread executes on a first execution unit, and the first uniformity signal causes a second execution unit on which the second thread executes to be disabled.

15. The method of claim 14, wherein the first uniformity signal causes the second execution unit to be clock-gated.

16. The method of claim 14, wherein the second thread is associated with an output multiplexer that is configured to select between the first output and an output of the second execution unit.

17. The method of claim 14, wherein the first execution unit comprises an arithmetic logic unit.

18. The method of claim 13, further comprising setting a first uniformity tag to indicate that the second output has been set equal to the first output.

19. The method of claim 18, further comprising performing write operations to store the first uniformity tag in a memory.

20. The method of claim 18, wherein determining that the value of each operand in the first set of operands equals the value of a corresponding operand in the second set of operands comprises determining that a value of each uniformity tag associated with the second set of operands has been set.

21. The method of claim 13, further comprising:

determining that a second operator corresponding to a second deterministic operation is assigned to both the first thread and the second thread;

determining that a value of an operand included in a third set of operands associated with the first thread does not equal a value of a corresponding operand included in a fourth set of operands associated with the second thread;

cause the first thread to execute the second operator on the third set of operands to generate a third output; and cause the second thread to execute the second operator on the fourth set of operands to generate a fourth output.

22. A computing device comprising:

a memory that includes a first set of operands associated with a first thread and a second set of operands associated with a second thread; and a streaming multiprocessor configured to:

determine whether an operator corresponding to a given deterministic operation is assigned to both the first thread and the second thread;

determine whether a value of each operand in the first set of operands equals a value of a corresponding operand in the second set of operands;

in response to determining that the operator corresponding to the given deterministic operation is assigned to both the first thread and the second thread and that the value of each operand in the first set of operands equals the value of a corresponding operand in the second set of operands, determine that the first thread and the second thread are uniform;

cause the first thread to execute the operator on the first set of operands to generate a first output;

in response to determining that the first thread and the second thread are uniform, activate a first uniformity signal; and in response to activating the first uniformity signal, cause the second thread to set a second output equal to the first output without executing the operator on the second set of operands.

23. The computing device of claim 22, wherein the first thread executes on a first execution unit, and the first uniformity signal causes a second execution unit on which the second thread executes to be disabled.

* * * * *